No. 719,572. PATENTED FEB. 3, 1903.
R. E. EVENDEN.
GEAR WHEEL.
APPLICATION FILED AUG. 21, 1902.
NO MODEL. 2 SHEETS—SHEET 1.
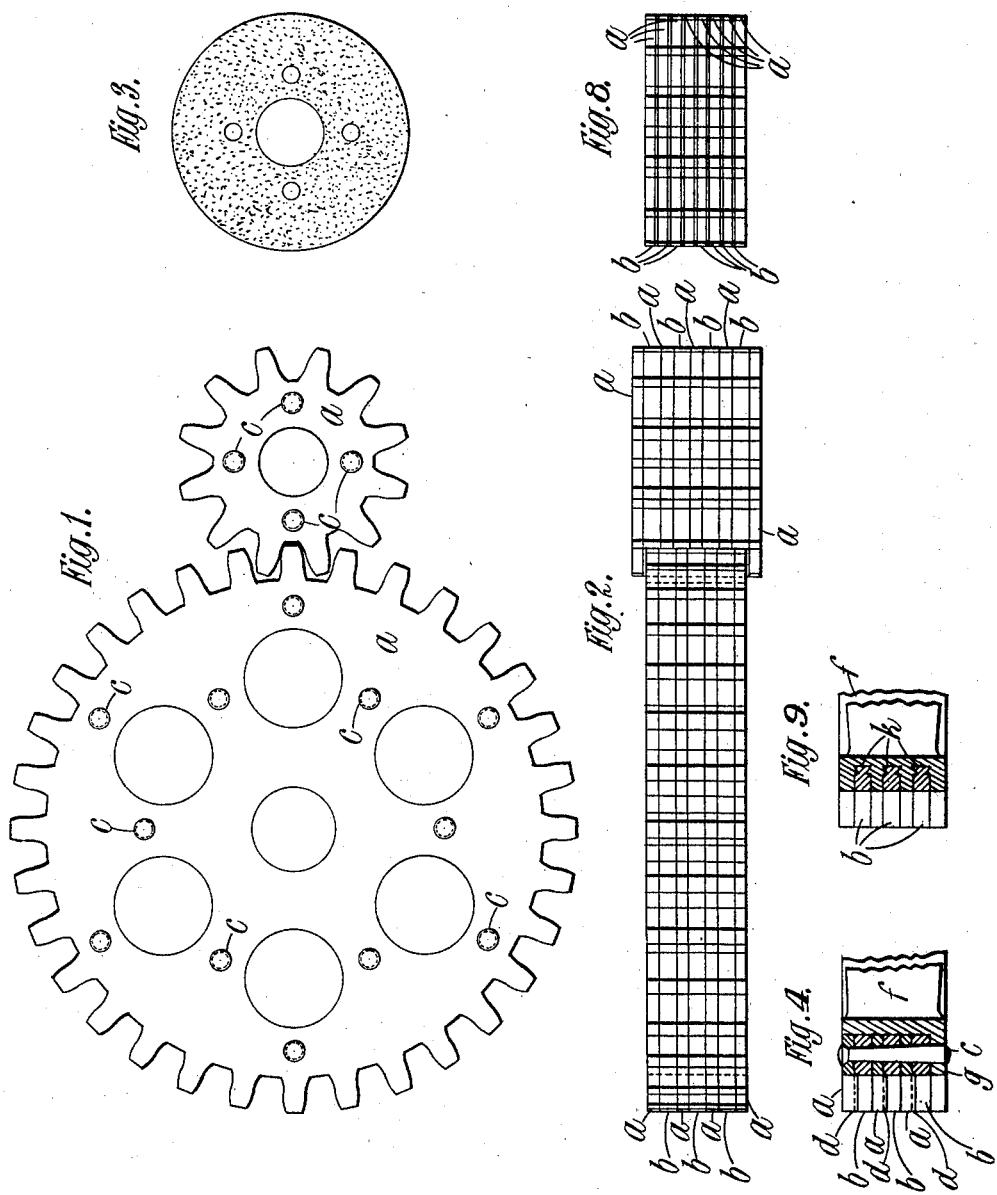
Witnesses:
M. M. O'Connor.
Q. Ellsworth.
Inventor,
Robert E. Evenden,
by his Attorneys, No. 719,572. PATENTED FEB. 3, 1903.
R. E. EVENDEN.
GEAR WHEEL.
APPLICATION FILED AUG. 21, 1902.
NO MODEL. 2 SHEETS—SHEET 2.
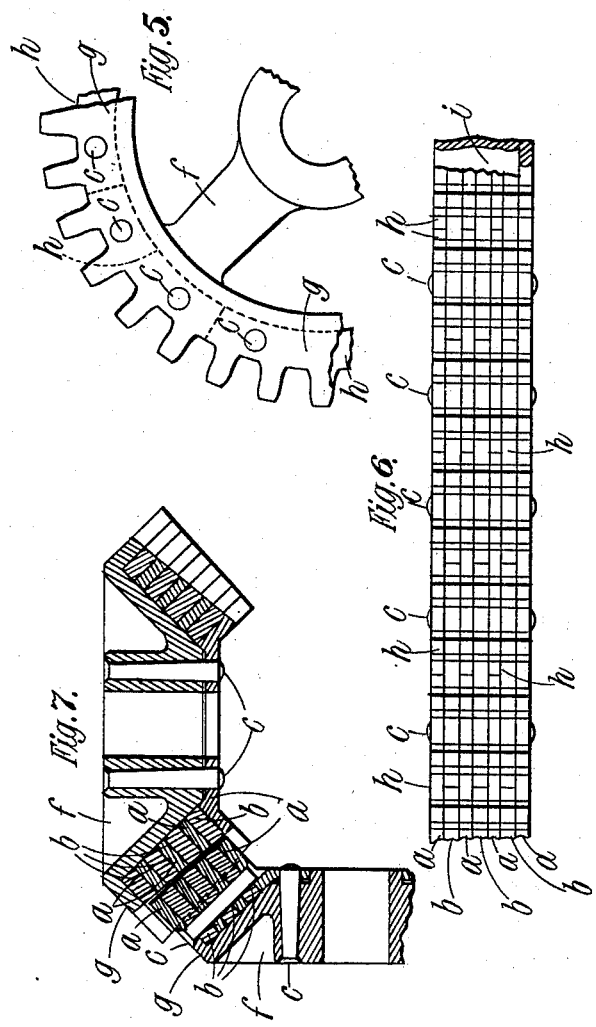

UNITED STATES PATENT OFFICE.

ROBERT EDWARD EVENDEN, OF MANCHESTER, ENGLAND.

GEAR-WHEEL.

SPECIFICATION forming part of Letters Patent No. 719,572, dated February 3, 1903.

Application filed August 21, 1902. Serial No. 120,567. (No model.)

*To all whom it may concern:*

Be it known that I, ROBERT EDWARD EVENDEN, a subject of His Majesty the King of Great Britain, residing at Manchester, in the county of Lancaster, England, have invented new and useful Improvements in and Relating to Gear-Wheels, of which the following is a specification.

My invention has for its object to produce a system of gearing which shall be less noisy in work than a gear made of solid metal and one which is stronger and more durable than a gear of equal size made wholly of vulcanized fiber, rawhide, wood, or other non-metallic material or even wholly of some cast metals.

My invention is illustrated in the accompanying drawings, wherein—

Figure 1 is a side elevation, and Fig. 2 is a plan, of a toothed wheel and pinion. Fig. 3 is a side elevation of one of the plates of a gear-wheel. Figs. 4 and 5 are respectively a transverse section and a part side elevation showing a modified construction of gear or element. Fig. 6 is a plan of a toothed rack. Fig. 7 is a transverse section through a pair of bevel-wheels. Fig. 8 is an edge view of a pinion or element constructed according to a further modification; and Fig. 9 is a similar view to Fig. 4, illustrative of a still further modification.

Like letters of reference refer to similar parts throughout the drawings.

My invention consists, essentially, in so forming a system of gearing that the teeth are composed of laminations or layers $a\,b$, of hard metal and some softer metal, the planes of the laminæ being coincident to the line along which the power is to be transmitted, and in so mounting or arranging the wheels or elements that their dissimilar layers run in contact. By making toothed gearing and by mounting or arranging the wheels or elements in this way the layers of different metal having different periods of vibration do not harmonize, and thus comparative silence is secured. The laminæ $a\,b$ may be sweated, cemented, or otherwise secured together. They may be subjected to pressure during construction, and they may be tightly held together by suitable means, such as rivets or taper pins $c$ or their equivalents.

Gear-wheels or elements constructed as described may be manufactured in a variety of ways; but preferably they are built up of a series of alternate disks or layers of hard metal $a$ and softer metal $b$, cemented or held together as aforesaid. If a gear or element thus formed be taken and the teeth cut in the usual way, it will be found that burs $d$ (see Fig. 4) will be formed on the layers $a$, which will assist in retaining the layers of softer metal $b$ in their places.

The disks or layers $a$ may be perforated or roughened by any suitable means, such as a center punch, as illustrated in Fig. 3, so as to aid them in uniting with the adjacent disks or layers $b$.

As shown in Figs. 4 and 5, a wheel $f$, having a flange $g$, may be employed. In this case the alternate annular layers $a\,b$ are divided into segments $h$, as indicated by dotted lines in Fig. 5, to facilitate construction. The segments of each layer are arranged to overlap the joint between two segments of the adjacent layers, all of which are united by rivets or taper pins $c$.

When constructing a rack and pinion, the rack may, as illustrated by Fig. 6, consist of angle-pieces $i$, to which alternate layers of hard metal $a$ and softer metal $b$ are riveted together in sections in the manner hereinbefore described.

Fig. 7 illustrates a convenient method of building up bevel or miter wheels. The wheels $f$ have flanges $g$ and alternate layers of hard metal $a$ and a softer metal $b$, which are clamped together by rivets $c$ or their equivalent. The alternate layers $a$ and $b$ may be annular or segmental.

In Fig. 8 I illustrate a gear or element constructed of plates of metal $a$, separated from each other by a thin layer $b$, consisting of solder.

An alternative method of manufacture is illustrated by Fig. 9, according to which a wheel or element $f$, of hard metal, is provided with a series of undercut grooves $k$, into which a soft metal $b$ is forced when in a plastic condition. After the metal $b$ has set the teeth are cut in the ordinary or any other convenient manner.

In all cases the elements of the gearing are so arranged that the hard-metal layers on one element run in contact with the layers of softer metal of the other element.

What I claim, and desire to secure by Letters Patent of the United States, is—

A toothed gear-wheel consisting of alternate layers of hard and soft metal firmly secured together, in combination with another intermeshing toothed gear-wheel consisting of alternate layers of hard and soft metal, with the soft metal in one gear arranged in contact with the hard metal of the other gear.

In testimony whereof I have hereunto subscribed my name.

ROBERT EDWARD EVENDEN.

Witnesses:
A. F. SPOONER,
J. S. WITHERS.